UNITED STATES PATENT OFFICE.

JOHN P. E. HEINTZ, OF CHICAGO, ILLINOIS, ASSIGNOR TO MANABRAN LAXATIVE BISCUIT COMPANY, OF CHICAGO, ILLINOIS, A CORPORATION OF OKLAHOMA.

BISCUIT.

No. 906,709.   Specification of Letters Patent.   Patented Dec. 15, 1908.

Application filed November 2, 1906.   Serial No. 341,791.

*To all whom it may concern:*

Be it known that I, JOHN P. E. HEINTZ, a citizen of the United States, residing at Chicago, in the county of Cook and State of Illinois, have invented a new and useful Improvement in Biscuits, of which the following is a specification.

My invention relates, more particularly, to an improvement in the class of biscuits commonly known as crackers.

The object of my invention is to provide, as a new article of manufacture for the market, and in the nature of a food-product, a biscuit in the class referred to having laxative properties, to the end that it may be eaten as a food and at the same time exert a desirable laxative effect upon the bowels.

To prepare my new article of manufacture I may employ ingredients commonly used for making crackers, and add thereto, in desirable proportion, bran and senna, as laxative ingredients to exert a synergistic action upon each other. A compound suitable for the production of my improved article of manufacture is the following, in the proportions specified, though these may be varied without departure from my invention:

| Ingredient | Amount |
|---|---|
| Wheat flour | 192 pounds. |
| Sugar | 40 " |
| Molasses | 25 " |
| Lard | 30 " |
| Soda bicarbonate | 2 " |
| Ammonia carbonate | 1 " |
| Water | 56 " |
| Bran | 20 " |
| Senna | 7 " |

The ingredients, except the two last named in the foregoing formula, are commonly used in the manufacture in the usual way of an ordinary, known grade of sweetened biscuit.

All of the ingredients of the foregoing formula may be mixed together to prepare the stock from which to produce my improved article of manufacture, and the kneaded dough is rolled to the proper degree of thinness, cut into biscuit shapes, and subjected to baking. The heat of baking causes the soda bicarbonate ingredient to act chemically upon the cathartic acid of the senna ingredient to modify the action of the latter, thus preventing any tendency to undue physiological activity and griping as a result of eating the biscuit, and causing the biscuit to produce mild physiological action.

In order that the senna and soda bicarbonate ingredients may be provided in the best condition for the exertion one upon the other of the chemical action referred to, it is found to be desirable instead of mixing all the ingredients together, to mix the senna and soda separately in about the proportions referred to, with water, bring the mixture to the boiling point, and then allow it to stand and cool for about twenty-four hours, then evaporate to dryness and pulverize the residuum. This residuum is thereby reduced to the proper condition for mixing with the other ingredients named in the foregoing formula, preparatory to the subsequent kneading, rolling and baking operations.

What I claim as new and desire to secure by Letters Patent, is—

1. As a new article of manufacture, a laxative biscuit composed of baked cracker-material, senna and bran.

2. As a new article of manufacture, a laxative biscuit composed of a baked mixture of cracker-material, including flour, saccharine matter, and soda bicarbonate, and senna and bran.

3. As a new article of manufacture, a laxative biscuit composed of a baked mixture of flour, sugar, molasses, lard, soda bicarbonate, ammonia carbonate, water, bran and senna, in substantially the proportions specified.

JOHN P. E. HEINTZ.

In presence of—
L. HEISLAR,
C. W. WASHBURNE.